April 9, 1940. G. MUSAPHIA 2,196,424
MEANS FOR AND METHOD OF CREATING ANIMATED EFFECTS
Filed Dec. 18, 1936 2 Sheets-Sheet 1

INVENTOR.
Georges Musaphia
BY
ATTORNEY.

April 9, 1940.                G. MUSAPHIA                2,196,424
               MEANS FOR AND METHOD OF CREATING ANIMATED EFFECTS
                   Filed Dec. 18, 1936        2 Sheets-Sheet 2
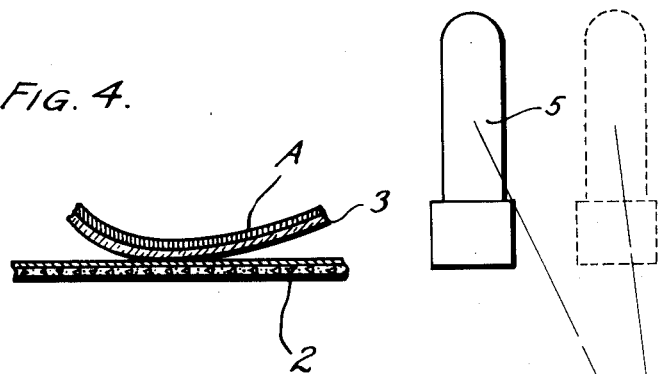
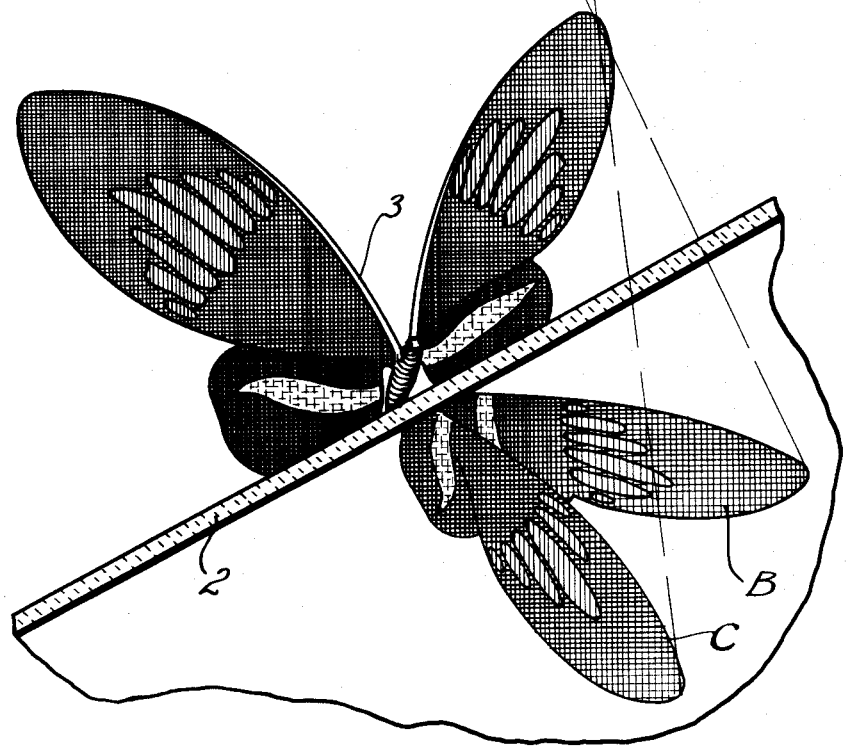
INVENTOR.
Georges Musaphia
BY
ATTORNEY.

Patented Apr. 9, 1940

2,196,424

UNITED STATES PATENT OFFICE 2,196,424

MEANS FOR AND METHOD OF CREATING ANIMATED EFFECTS

Georges Musaphia, Los Angeles, Calif.

Application December 18, 1936, Serial No. 116,520

6 Claims. (Cl. 40—132)

This invention relates to and has for an object the provision of a means and a method for creating animated effects of pronounced brilliance and color of an unusually novel and highly ornamental and fanciful nature, useful for display purposes or in making motion pictures, by causing relative movement of a fluorescent object and a source of ultra-violet or other given wave length light rays behind a translucent screen through which the object is visible in said animated effect under excitation of said short wave length rays.

A further object is to provide a means and method such as described wherein the fluorescent figure or object is affixed to the face of the translucent screen opposite that through which viewed, and has portions in adjacent and different planes whereby to enhance the animated effects, the said effects being produced without shadows, such as would be the case in using ordinary light rays.

A further object is to provide a means and a method such as described wherein a fluorescent object or a figure having a fluorescent coating mounted on a translucent screen, and a source of ultra-violet or other given wave length light will produce the aforesaid animated effects, upon varying the angles at which the light rays encounter the object or figure with the latter in the same or different planes, as by relative movement of said elements, or otherwise.

An additional object is to provide an apparatus for producing the aforesaid animated effects, and which includes a motor and means operated thereby for causing a control and predetermined relative movement between the fluorescent object and the source of ultra-violet or given wave length rays, said means operating when the light source is to be moved, to maintain said source in upright position, and to cause an irregular circuitous movement thereof whereby to enhance the animated effect.

I have shown in the accompanying drawings a preferred form of means for and method of creating animated effects embodying my invention, subject, however, to modification, within the scope of the appended claims, without departing from the spirit of my invention.

In said drawings:

Fig. 3 is an enlarged schematic or diagrammatic view in perspective and showing the animated effect as appearing in colors on the screen and indicating the manner in which said effect is produced;

Fig. 4 is a fragmentary sectional view taken through the screen at the point of attachment thereto of a figure to be animated, said figure being shown in section and coated with fluorescent material.

Figure 1:
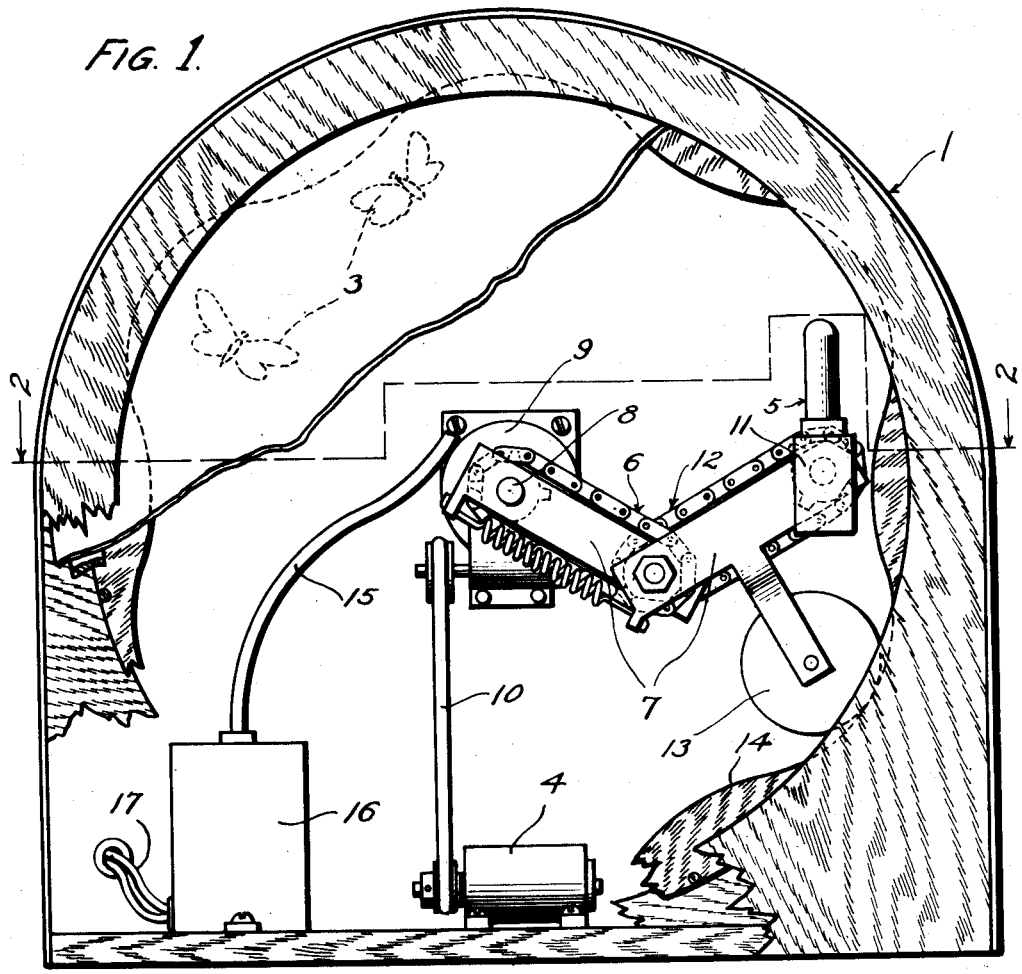
Fig. 1 is a fragmentary front elevation of an apparatus by which the method of this invention may be carried out.

With reference to the accompanying drawings wherein there is shown one form of apparatus with which the method of this invention may be carried out, said apparatus comprises generally a casing 1 supporting a translucent screen 2, fluorescent coated objects or figures 3 affixed to or adjacent the inner face of said screen, a motor 4, a source of ultra-violet or other given wave length light rays 5, and a means 6 operated by said motor for producing relative movement between said objects and said source. As here shown, the means 6 is adapted to move the light source 5 in a circuitous path whereby the rays emanating from said source will encounter the object 3 at various angles and excite the fluorescent material on said object whereby to produce the animated effects visible throughout said screen.

Figure 2:
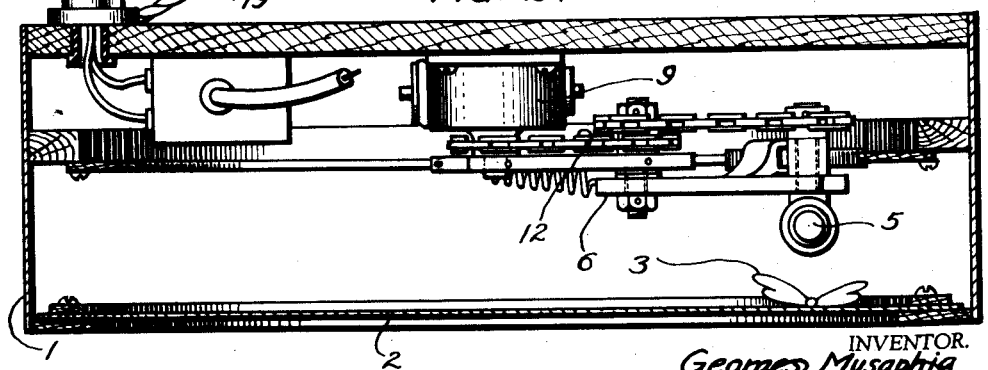
Fig. 2 is a sectional view taken on the plane of line 2—2 of Fig. 1.

Inasmuch as it may be desirable to maintain a light source of this character in a vertical or upright position at all times, the means 6 is constructed and arranged to accomplish this purpose. As here shown, said means comprises an articulated crank arm 7 fixed on the shaft 8 of a reduction gear unit 9, fixed on the rear wall of the casing and operated by the motor through a belt drive 10. On the outer end of this crank arm, a holder or support 11 is loosely or freely mounted so that as the arm rotates, the lamp or source 5 on said holder will remain in upright position. A parallel motion mechanism indicated at 12, and which it is deemed unnecessary to describe in detail, is driven by the motor shaft and arranged on said crank arm 11, and operates the holder 11 whereby to maintain the upright position thereof at all times. As a means for causing movement of the light source in an irregular, circuitous path, the arm 7 may be provided with a guide roller 13 cooperating with an irregular track 14, as particularly shown in Figs. 1 and 2. The electrical connection with the source of light is provided for through a high tension conductor 15 connected with the metal of the light moving and supporting mechanism, the light being suitably grounded to said metal. This conductor leads from a transformer 16, having connections as at 17 with a switch 18 on the back of the casing. This switch is connected with a source of electrical energy not shown through conductors 19.

In accordance with the present embodiment of this invention, the objects or figures 3 may partake of any design, but, as here shown, simulate butterflies. These objects are made of transparent or translucent material and have their rear faces, that is, the faces thereof exposed to the ultra-violet or other given wave length light source, coated, as indicated at A in Fig. 4, with fluorescent paint or material, preferably brightly colored. However, any colors may be used in this coating, provided the coating is fluorescent and will become intensely excited and illuminated by the ultra-violet or given rays directed thereon from the light source. As shown in Fig. 3, the design is lined to indicate colors, and when excited by the short wave length light rays, said design in the brilliant colors thus indicated will be clearly visible through the translucent screen 2. By having the angle of the light rays constantly changing, the fluorescent effects will change and simulate movement of the object, there being, however, no shadows cast on the screen, due to the fact that ultra-violet and like given wave length light rays will not produce shadow effects, when cast upon an object, such as the one 3, and especially as said object is translucent and fluorescent.

I have found that by cementing or otherwise securing the objects 3 to the rear face of the screen and rearwardly offsetting other portions of the objects from the plane of said rear face, the animated effects will be materially increased and the object will appear to move under excitation of said given wave length rays. As shown in Fig. 3, movement of the source of light, as indicated, will produce the effect of motion of the wings of the butterfly, as indicated at the points B, C in said figure, the wing in one instance appearing at the point B, and in the next position of the light appearing at the point C whereby to simulate movement. It should be noted that this effect is produced in brilliant color, for example, the color as indicated in Fig. 3, and without shadows.

It will thus be seen that by moving a source of ultra-violet light relative to a fluorescent figure, having outwardly bent portions, or, obviously, by moving the figure relative to the light with said figure mounted on or adjacent a fluorescent screen, the given wave length rays will excite the fluorescent figure and movement thereof will be simulated on the screen.

I claim:

1. An apparatus for creating animated effects, comprising a translucent screen, a translucent figure which is to simulate movement, fixed adjacent the rear face of said screen, and having a fluorescent coating, said figure having portions thereof offset from the plane of the portion affixed to the screen, a source of ultra-violet light arranged to direct rays onto said figure, and means for effecting relative movement between said light and figure while said figure fluoresces.

2. An apparatus for creating animated effects, comprising a translucent screen, a translucent figure which is to simulate movement, fixed adjacent the rear face of said screen, and having a fluorescent coating, said figure having fluorescent portions thereof offset from the plane of the portion affixed to the screen, a source of light arranged to direct onto said figure rays of a given wave length for causing said figure to fluoresce, and means for effecting relative movement between said light and figure, said means including a motor, a means operated thereby for moving the source of light in a predetermined path relative to said figure.

3. An apparatus for creating animated effects, comprising a translucent screen, a translucent figure which is to simulate movement, fixed on the rear face of said screen, and having fluorescent coating, said figure having portions thereof offset from the plane of the portion affixed to the screen, a source of ultra-violet light arranged to emanate rays onto said figure, and means for effecting relative movement between said light and figure, said means including a motor, a means operated thereby for moving the source of light in a predetermined path relative to said figure, including means for maintaining said light source in a perpendicular position while effecting movement thereof.

4. An apparatus for creating animated effects, comprising a translucent screen, a translucent figure which is to simulate movement, fixed on the rear face of said screen, and having fluorescent coating, said figure having portions thereof offset from the plane of the portion affixed to the screen, a source of ultra-violet light arranged to emanate rays onto said figure, and means for effecting relative movement between said light and figure, said means including a motor, a means operated thereby for moving the source of light in a predetermined path relative to said figure, and means for causing said light to follow an irregular path of movement.

5. An apparatus for creating animated effects, comprising a translucent screen, a translucent figure which is to simulate movement, fixed adjacent the rear face of said screen, said figure having portions thereof offset from the plane of the portion next adjacent the screen, said offset portions having a fluorescent coating, a source of ultra-violet light arranged to direct rays onto said figure, and means for effecting relative movement between said light and figure while said figure fluoresces.

6. An apparatus for creating animated effects, comprising a light penetrable screen, a light penetrable figure disposed adjacent the rear face of said screen and having portions offset from the plane of the portion next adjacent the screen, at least a part of said figure having a fluorescent coating, a source of light of given wave length arranged to direct rays onto said figure, and means for effecting relative movement between said light and figure.

GEORGES MUSAPHIA.